United States Patent
Gulwani et al.

(10) Patent No.: US 11,620,304 B2
(45) Date of Patent: Apr. 4, 2023

(54) EXAMPLE MANAGEMENT FOR STRING TRANSFORMATION

(71) Applicant: Microsoft Technology Licensing, LLC, Redmond, WA (US)

(72) Inventors: Sumit Gulwani, Sammamish, WA (US); Ranvijay Kumar, Sammamish, WA (US); Chairy Chiu Ying Cheung, Redmond, WA (US); Daniel Adam Perelman, Seattle, WA (US); Euan Peter Garden, Bellevue, WA (US); Giovanni M. Della-Libera, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 266 days.

(21) Appl. No.: 15/299,329

(22) Filed: Oct. 20, 2016

(65) Prior Publication Data

US 2018/0113922 A1    Apr. 26, 2018

(51) Int. Cl.
*G06F 16/25* (2019.01)
*G06F 16/215* (2019.01)

(52) U.S. Cl.
CPC .......... *G06F 16/258* (2019.01); *G06F 16/215* (2019.01)

(58) Field of Classification Search
None
See application file for complete search history.

(56) References Cited

U.S. PATENT DOCUMENTS

| | | |
|---|---|---|
| 5,504,848 A | 4/1996 | Yamada et al. |
| 5,790,760 A | 8/1998 | Arima |
| 5,920,717 A | 7/1999 | Noda |
| 6,035,302 A | 3/2000 | Tonouchi |
| 6,327,699 B1 | 12/2001 | Larus et al. |
| 6,484,310 B1 | 11/2002 | Przybylski et al. |
| 6,882,999 B2 | 4/2005 | Cohen et al. |

(Continued)

FOREIGN PATENT DOCUMENTS

| | | |
|---|---|---|
| CN | 1400547 A | 3/2003 |
| CN | 101639861 A | 2/2010 |

(Continued)

OTHER PUBLICATIONS

ISA European Patent Office, International Search Report and Written Opinion Issued in PCT Application No. PCT/US2017/057779, Dec. 6, 2017, WIPO, 13 pages.

(Continued)

*Primary Examiner* — Allen S Lin
*Assistant Examiner* — Soheila (Gina) Davanlou
(74) *Attorney, Agent, or Firm* — Alleman Hall Creasman & Tuttle LLP

(57) ABSTRACT

A method for transforming strings includes identifying one or more candidate example input strings from a database including a set of input strings. The candidate example input strings are presented for example transformation. For one or more of the candidate example input strings, an example output string corresponding to that example input string is received, where each example input string and its corresponding example output string define a transformation example in an example set. A string transformation program is generated based on transformation examples in the example set.

16 Claims, 7 Drawing Sheets

| | 1 | 2 | 3 |
|---|---|---|---|
| A | JOHN SMITH | PORTLAND, OR | PORTLAND, OR |
| B | JANE A. SMITH | BEND OR | BEND, OR |
| C | ALFRED P | PORTLAND, OR | PORTLAND, OR |
| D | JON S. | BOZEMAN MT | BOZEMAN MT, OR |
| E | DOUG SCHWARZ | PORTLAND, OR | PORTLAND, OR |
| F | J. ANDREW PHILLIPS | SYDNEY, AUSTRALIA | SYDNEY, AUSTRALIA, OR |
| G | JAYME F. B. | LOS ANGELES | LOS ANGELES, OR |

(56) References Cited

U.S. PATENT DOCUMENTS

| | | | |
|---|---|---|---|
| 6,963,871 B1 | 11/2005 | Hermansen et al. | |
| 7,010,779 B2 | 3/2006 | Rubin et al. | |
| 7,155,683 B1 | 12/2006 | Williams | |
| 7,165,019 B1 | 1/2007 | Lee et al. | |
| 7,254,569 B2 | 8/2007 | Goodman et al. | |
| 7,376,937 B1 | 5/2008 | Srivastava et al. | |
| 7,433,885 B2 | 10/2008 | Jones | |
| 7,546,541 B2 | 6/2009 | Hori et al. | |
| 7,676,444 B1 | 3/2010 | Venkatachary et al. | |
| 7,979,268 B2 | 7/2011 | Lee | |
| 8,065,336 B2 | 11/2011 | Armstrong et al. | |
| 8,175,875 B1 | 5/2012 | Dean et al. | |
| 8,332,383 B2 | 12/2012 | Posner et al. | |
| 8,484,230 B2 | 7/2013 | Harnett et al. | |
| 8,589,874 B2 | 11/2013 | Ralls et al. | |
| 8,600,916 B2 | 12/2013 | Chen et al. | |
| 8,601,019 B1 | 12/2013 | Weininger et al. | |
| 8,650,207 B2 | 2/2014 | Gulwani et al. | |
| 8,655,775 B1 | 2/2014 | Howe | |
| 8,694,883 B2 | 4/2014 | Matsumoto | |
| 8,799,234 B2 | 8/2014 | Gulwani et al. | |
| 8,850,263 B1 | 9/2014 | Yourtee et al. | |
| 8,850,310 B2 | 9/2014 | Rampson et al. | |
| 8,972,930 B2 | 3/2015 | Gulwani | |
| 9,002,758 B2 | 4/2015 | Gulwani et al. | |
| 9,031,955 B2 | 5/2015 | Carasso et al. | |
| 9,311,289 B1 | 4/2016 | Kaptur et al. | |
| 2002/0069220 A1 | 6/2002 | Tran | |
| 2003/0004874 A1 | 1/2003 | Ludwig et al. | |
| 2003/0154187 A1 | 8/2003 | Hayakawa et al. | |
| 2004/0158810 A1 | 8/2004 | Dove et al. | |
| 2004/0210842 A1 | 10/2004 | Qamar | |
| 2004/0243618 A1 | 12/2004 | Malaney et al. | |
| 2005/0080755 A1 | 4/2005 | Aoyama | |
| 2005/0149536 A1 | 7/2005 | Wildes et al. | |
| 2005/0182629 A1 | 8/2005 | Coorman et al. | |
| 2005/0228640 A1 | 10/2005 | Aue et al. | |
| 2005/0246681 A1 | 11/2005 | Little et al. | |
| 2006/0161844 A1 | 7/2006 | Simkhay et al. | |
| 2006/0206507 A1 | 9/2006 | Dahbour | |
| 2007/0050700 A1 | 3/2007 | Simkhay et al. | |
| 2007/0055493 A1 | 3/2007 | Lee | |
| 2007/0078872 A1 | 4/2007 | Cohen | |
| 2007/0244694 A1* | 10/2007 | Hosokawa | G06F 17/2735 704/10 |
| 2007/0250765 A1 | 10/2007 | Chen et al. | |
| 2008/0282108 A1 | 11/2008 | Jojic et al. | |
| 2009/0049354 A1 | 2/2009 | Buckley, Jr. | |
| 2009/0077542 A1 | 3/2009 | Chou et al. | |
| 2009/0106710 A1 | 4/2009 | Teig et al. | |
| 2009/0110282 A1* | 4/2009 | Tanaka | G06K 9/033 382/181 |
| 2009/0119307 A1 | 5/2009 | Braun et al. | |
| 2009/0119416 A1 | 5/2009 | Sirdevan et al. | |
| 2009/0119584 A1 | 5/2009 | Herbst | |
| 2009/0132477 A1 | 5/2009 | Zuev et al. | |
| 2009/0210418 A1* | 8/2009 | Arasu | G06F 17/30569 |
| 2009/0226081 A1 | 9/2009 | Zhou et al. | |
| 2009/0288065 A1 | 11/2009 | Nathan et al. | |
| 2009/0300326 A1 | 12/2009 | Sweeney | |
| 2009/0327888 A1 | 12/2009 | Woolf et al. | |
| 2010/0037127 A1 | 2/2010 | Tomasic et al. | |
| 2010/0083092 A1 | 4/2010 | Schuller et al. | |
| 2010/0125828 A1 | 5/2010 | Vasista | |
| 2010/0146254 A1 | 6/2010 | Park et al. | |
| 2010/0250563 A1 | 9/2010 | Cao et al. | |
| 2010/0312549 A1 | 12/2010 | Akuwudike | |
| 2011/0038531 A1 | 2/2011 | Arasu et al. | |
| 2011/0119284 A1 | 5/2011 | Viswanathan et al. | |
| 2011/0302553 A1* | 12/2011 | Gulwani | G06F 9/44 717/107 |
| 2012/0011084 A1 | 1/2012 | Gulwani et al. | |
| 2012/0011152 A1 | 1/2012 | Gulwani et al. | |
| 2012/0192051 A1* | 7/2012 | Rothschiller | G06F 17/211 715/217 |
| 2012/0197887 A1 | 8/2012 | Anderson | |
| 2013/0132410 A1* | 5/2013 | Rineer | G06F 16/90344 707/758 |
| 2013/0191714 A1 | 7/2013 | Rothschiller et al. | |
| 2013/0226945 A1* | 8/2013 | Swinson | G06Q 30/0283 707/758 |
| 2013/0326475 A1* | 12/2013 | Gulwani | G06F 8/427 717/107 |
| 2013/0346982 A1* | 12/2013 | Kalai | G06F 8/30 718/100 |
| 2014/0059078 A1 | 2/2014 | Gulwani et al. | |
| 2014/0195884 A1* | 7/2014 | Castelli | G06F 17/278 715/201 |
| 2014/0324583 A1 | 10/2014 | Chen et al. | |
| 2014/0372854 A1 | 12/2014 | Otero et al. | |
| 2014/0372857 A1 | 12/2014 | Otero et al. | |
| 2015/0169530 A1 | 6/2015 | Otero et al. | |
| 2015/0220605 A1 | 8/2015 | Syed et al. | |
| 2015/0254530 A1 | 9/2015 | Gulwani et al. | |
| 2016/0055157 A1* | 2/2016 | Morimoto | G06F 17/3053 707/737 |
| 2016/0224621 A1 | 8/2016 | Bousquet et al. | |
| 2016/0259779 A1* | 9/2016 | Labsk | G06F 40/35 |
| 2017/0024424 A1 | 1/2017 | Almohizea | |
| 2017/0060367 A1 | 3/2017 | Berlingerio et al. | |
| 2017/0090893 A1 | 3/2017 | Aditya et al. | |
| 2017/0109389 A1* | 4/2017 | Bardoliwalla | G06F 16/24539 |
| 2017/0315683 A1 | 11/2017 | Boucher et al. | |

FOREIGN PATENT DOCUMENTS

| | | |
|---|---|---|
| EP | 2506155 A1 | 10/2012 |
| WO | 9835306 A1 | 8/1998 |
| WO | 2010088523 A1 | 8/2010 |

OTHER PUBLICATIONS

De Choudhury, M. et al., "How Does the Data Sampling Strategy Impact the Discovery of Information Diffusion in Social Media?," Proceedings of the Fourth International AAAI Conference on Weblogs and Social Media, May 23, 2010, Washington, DC, 8 pages.

"emftext User Guide," emftext Website, Available Online at http://www.emftext.org/EMFTextGuide.php, Jun. 1, 2012, 39 pages.

Mitchell, T., "Generalization as Search," Artificial Intelligence, vol. 18, No. 2, Mar. 1982, 24 pages.

Nix, R., "Editing by Example," ACM Transactions on Programming Languages and Systems, vol. 7, No. 4, Oct. 1985, 22 pages.

Angluin, D., "Learning Regular Sets from Queries and Counterexamples," Information and Computation, vol. 75, No. 2, Nov. 1, 1987, 20 pages.

Richardson, D. et al., "Approaches to Specification-Based Testing," Proceedings of the Third ACM SIGSOFT Symposium on Software Testing, Analysis, and Verification (TAV3), Dec. 13, 1989, Key West, Florida, 11 pages.

Cypher, A., "EAGER: Programming Repetitive Tasks by Example," Proceedings of the SIGCHI Conference on Human Factors in Computing Systems (CHI '91), Apr. 28, 1991, New Orleans, Louisiana, 9 pages.

Vilar, J., "Query Learning of Subsequential Transducers," Proceedings of the 3rd International Colloquium on Grammatical Inference: Learning Syntax from Sentances (ICGI '96), Sep. 25, 1996, Montpellier, France, 12 pages.

Chattratichat, J. et al., "A Visual Language for Internet-based Data Mining and Data Visualization," Proceedings of the 1999 IEEE Symposium on Visual Languages, Sep. 13, 1999, Tokyo, Japan, 8 pages.

Schrodl, S. et al., "Inferring Flow of Control in Program Synthesis by Example," Proceedings of the 23rd Annual German Conference on Artificial Intelligence: Advances in Artificial Intelligence (KI '99), Sep. 13, 1999, 12 pages.

Lau, T. et al., "Version Space Algebra and its Application to Programming by Demonstration," Proceedings of the Seventeenth International Conference on Machine Learning (ICML '00), Jun. 29, 2000, Stanford, California, 8 pages.

(56) References Cited

OTHER PUBLICATIONS

Witten, I. et al., "Chapter 8—TELS: Learning Text Editing Tasks from Examples," Allen Cypher Website, Available Online at http://acypher.com/wwid/Chapters/08TELS.html, Available as Early as Dec. 7, 2000, Retrieved Jun. 13, 2012, 17 pages.

Lau, T. et al., "Learning Repetitive Text-editing Procedures with SMARTedit," in Book "Your Wish is My Command Programming by Example," Morgan Kaufmann Publishers Inc., Mar. 1, 2001, San Francisco, California, 14 pages.

Miller, R. et al., "Interactive Simultaneous Editing of Multiple Text Regions," Proceedings of the General Track : 2001 USENIX Annual Technical Conference, Jun. 25, 2001, Boston, Massachusetts, 16 pages.

Matskin, M. et al., "Value-Added Web Service Composition Using Automatic Program Synthesis," Proceedings of the Revised Papers from the International Workshop on Web Services, E-Business, and the Semantic Web (CAiSE '02/WES '02), LNCS 2512, May 27, 2002, Toronto, Ontario, 12 pages.

Tejada, S. et al., "Learning Domain-Independent String Transformation Weights for High Accuracy Object Identification," Proceedings of the 8th ACM SIGKDD International Conference on Knowledge Discovery and Data Mining (SIGKDD '02), Jul. 23, 2002, Edmonton, Alberta, 10 pages.

Alvarez, M. et al., "FINDER: A Mediator System for Structured and Semi-Structured Data Integration," Proceedings of the 13th International Workshop on Database and Expert Systems Applications (DEXA '02), Sep. 6, 2002, Aix-en-Provence, France, 5 pages.

Lau, T. et al., "Programming by demonstration using version space algebra," Machine Learning, vol. 53, No. 1-2, Oct. 2003, 60 pages.

Lau, T. et al., "Learning Programs from Traces using Version Space Algebra," Proceedings of the 2nd International Conference on Knowledge Capture (K-CAP '03), Oct. 23, 2003, Sanibel Island, Florida, 8 pages.

"Planning, Installation, and Problem Determination Guide," Callpath Website, Available Online at https://web.archive.org/web/20040219025036/http://callpath.genesyslab.com/docs63/html/cpepipd/epipd142.htm, Available as Early as Feb. 19, 2004, Retrieved Feb. 24, 2010, 14 pages.

Lau, T. et al., "Programming shell scripts by demonstration," Proceedings of the AAAI-04 Workshop Program, W16: Supervisory Control of Learning and Adaptive Systems, Jul. 25, 2004, San Jose, California, 5 pages.

Gulwani, S. et al., "A Polynomial-Time Algorithm for Global Value Numbering," Proceedings of the 11th International Static Analysis Symposium (SAS 2004), LNCS 3148, Aug. 26, 2004 ,Verona, Italy, 17 pages.

Ko, A. et al., "Six Learning Barriers in End-User Programming Systems," Proceedings of the 2004 IEEE Symposium on Visual Languages—Human Centric Computing (VLHCC '04), Sep. 26, 2004, Rome, Italy, 8 pages.

"PADS Documentation," PADS Website, Retrieved Online at http://www.padsproj.org/doc.html, Available as Early as Mar. 20, 2005, Retrieved Jul. 5, 2010, 3 pages.

"Amazon.com: Tricks of the Microsoft Office gurus. (Business solutions): Paul. McFedries," Amazon Website, Offer to Sell Book, Available Online at https://www.amazon.com/Tricks-Microsoft-Office-Gurus-McFedries/dp/0789733692/ref=sr_1_2?ie=UTF8&qid=1488389104&sr=8-2&keywords=tricks+of+the+microsoft+office+gurus.+%28Business+solutions%29, Book Published Apr. 2005, 1 page.

Fisher, K. et al., "PADS: A Domain-Specific Language for Processing Ad Hoc Data," Proceedings of the 2005 ACM SIGPLAN Conference on Programming Language Design and Implementation (PLDI'05), Jun. 12, 2005, Chicago, Illinois, 10 pages.

Fisher, K. et al., "The Next 700 Data Description Languages," Conference Record of the 33rd ACM SIGPLAN-SIGACT Symposium on Principles of Programming Languages (POPL '06), Jan. 11, 2006, Charleston, South Carolina, 14 pages.

Myers, B. et al., "Invited Research Overview: End-User Programming," Proceedings of the Extended Abstracts on Human Factors in Computer Systems (CHI EA '06), Apr. 22, 2006, Montreal, Quebec, 6 pages.

Embley, D. et al., "Table-processing paradigms: a research survey," International Journal of Document Analysis, vol. 8, No. 2, Jun. 2006, Published Online May 9, 2006, 21 pages.

Solar-Lezama, A. et al., "Sketching Stencils," Proceedings of the 28th ACM SIGPLAN Conference on Programming Language Design and Implementation (PLDI'07), Jun. 11, 2007, San Diego, California, 12 pages.

Fisher, K. et al., "From Dirt to Shovels: Fully Automatic Tool Generation from Ad Hoc Data," Proceedings of the 35th Annual ACM SIGPLAN-SIGACT Symposium on Principles of Programming Languages (POPL'08), Jan. 7, 2008, San Francisco, California, 14 pages.

De Moura, L. et al., "Z3: An Efficient SMT Solver," Proceedings of the Theory and Practice of Software: 14th International Conference on Tools and Algorithms for the Construction and Analysis of Systems (TACAS'08/ETAPS'08), LNCS 4963, Mar. 29, 2008, Budapest, Hungary, 4 pages.

Lau, T., "Why PBD systems fail: Lessons learned from usable AI," Proceedings of the CHI 2008 Workshop on Usable Artificial Intelligence, Apr. 5, 2008, Florence, Italy, 4 pages.

Fisher, K. et al., "LearnPADS: Automatic Tool Generation from Ad Hoc Data," Proceedings of the 2008 ACM SIGMOD International Conference on Management of Data (SIGMOD '08), Jun. 9, 2008, Vancouver, British Columbia, 3 pages.

Zhang, Y. et al., "Editable Replay of IDE-based Repetitive Tasks," Proceedings of the 32nd Annual IEEE International Computer Software and Applications Conference (COMPSAC '08), Jul. 28, 2008, Turku, Finland, 8 pages.

Elhadi, M. et al., "Use of Text Syntactical Structures in Detection of Document Duplicates," Proceedings of the Third International Conference on Digital Information Management (ICDIM 2008), Nov. 13, 2008, London, United Kingdom, 6 pages.

Xi, Q. et al., "Ad Hoc Data and the Token Ambiguity Problem," Proceedings of the 11th International Symposium on Practical Aspect of Declarative Languages (PADL 2009), Jan. 19, 2009, Savannah, Georgia, 15 pages.

Guaitieri, D. et al., "Executive Summary of: Deputize End-User Developers to Deliver Business Agility and Reduce Costs," Excerpt Available Online at https://www.forrester.com/report/Deputize+EndUser+Developers+To+Deliver+Business+Agility+And+Reduce+Costs/-/E-RES54191, Apr. 15, 2009, 2 pages.

Gong, H. et al., "Automating Microsoft Office Word in Visual Basic," Proceedings of the Second International Symposium on Electronic Commerce and Security (ISECS '09), May 22, 2009, Nanchang, China, 5 pages.

Arasu, A. et al., "Learning String Transformations From Examples," Proceedings of the 35th International Conference on Very Large Data Bases (VLDB '09), Aug. 24, 2009, Lyon, France, 12 pages.

"Amazon.com: Artificial Intelligence: A Modern Approach (3rd Edition) (9780136042594)," Amazon Website, Offer to Sell Book, Available Online at https://www.amazon.com/Artificial-Intelligence-Modern-Approach-3rd/dp/0136042597, Book Published Dec. 11, 2009, 6 pages.

"Program Synthesis," Microsoft Research Website, Available Online at https://www.microsoft.com/en-us/research/project/program-synthesis/, Jan. 1, 2010, 4 pages.

Srivastava, S. et al., "From Program Verification to Program Synthesis," Proceedings of the 37th Annual ACM SIGPLAN-SIGACT Symposium on the Principles of Programming Languages (POPL '10), Jan. 17, 2010, Madrid, Spain, 14 pages.

Das Sarma, A. et al., "Synthesizing View Definitions from Data," Proceedings of the 13th International Conference on Database Theory (ICDT '10), Mar. 23, 2010, Lausanne, Switzerland, 15 pages.

Jha, S. et al., "Oracle-Guided Component-Based Program Synthesis," Proceedings of the 32nd ACM/IEEE International Conference on Software Engineering—vol. 1 (ICSE '10), May 2, 2010, Cape Town, South Africa, 10 pages.

(56) References Cited

OTHER PUBLICATIONS

"Amazon.com: Excel 2010 Formulas (Mr. Spreadsheet's Bookshelf) (9780470475362)," Amazon Website, Offer to Sell Book, Available Online at https://www.amazon.com/Excel-2010-Formulas-John-Walkenbach/dp/0470475366/ref=mt_paperback?_encoding=UTF8&me=, Book Published May 24, 2010, 6 pages.
Chaudhuri, S. et al., "Smooth Interpretation," Proceedings of the 31st ACM SIGPLAN Conference on Programming Language Design and Implementation (PLDI '10), Jun. 5, 2010, Toronto, Ontario, 13 pages.
Kuncak, V. et al., "Complete Functional Synthesis," Proceedings of the 31st ACM SIGPLAN Conference on Programming Language Design and Implementation (PLDI '10), Jun. 5, 2010, Toronto, Ontario, 14 pages.
Xi, Q. et al., "A Context-free Markup Language for Semi-structured Text," Proceedings of the 31st ACM SIGPLAN Conference on Programming Language Design and Implementation (PLDI '10), Jun. 5, 2010, Toronto, Ontario, 12 pages.
"Sumit Gulwani's Homepage," Microsoft Research Website, Available Online at https://www.microsoft.com/en-us/research/people/sumitg/, Retrieved Jul. 5, 2010, 4 pages.
Gulwani, S., "Dimensions in Program Synthesis," Proceedings of the 12th International ACM SIGPLAN Symposium on Principles and Practice of Declarative Programming (PPDP '10), Jul. 26, 2010, 12 pages.
Gulwani, S., "Automating String Processing in Spreadsheets Using Input-Output Examples," Proceedings of the 38th Annual SIGPLAN-SIGACT Symposium on Principles of Programming Languages (PoPL'11), Jan. 26, 2011, Austin, Texas, 13 pages.
Harris, W. et al., "Spreadsheet Table Transformations from Examples," Proceedings of the 32nd ACM SIGPLAN Conference on Programming Language Design and Implementation (PLDI '11) Jun. 4, 2011, San Jose, California, 17 pages.
Singh, R. et al., "Learning Semantic String Transformations from Examples," Proceedings of the VLDB Endowment, vol. 5, No. 8, Apr. 2012, 16 pages.
Singh, R. et al., "Synthesizing Number Transformations from Input-Output Examples," Proceedings of the 24th International Conference on Computer Aided Verification (CAV 2012), LNCS 7358, Jul. 7, 2012, Berkeley, California, 72 pages.
ISA Korean Intellectual Property Office, International Search Report and Written Opinion Issued in Application No. PCT/US2011/037411, dated Feb. 9, 2012, WIPO, 8 pages.
United States Patent and Trademark Office, Office Action Issued in U.S. Appl. No. 12/834,031, dated May 10, 2012, 16 pages.
United States Patent and Trademark Office, Office Action Issued in U.S. Appl. No. 12/834,031, dated Oct. 15, 2012, 16 pages.
European Patent Office, European Search Report Issued in Application No. 11790189.2, dated Oct. 21, 2013, Germany, 2 pages.
European Patent Office, Office Action Issued in Application No. 11790189.2, dated Nov. 4, 2013, Germany, 6 pages.
United States Patent and Trademark Office, Office Action Issued in U.S. Appl. No. 13/020,153, dated Nov. 14, 2013, 10 pages.
United States Patent and Trademark Office, Office Action Issued in U.S. Appl. No. 12/834,031, dated Jan. 3, 2014, 20 pages.
State Intellectual Property Office of the People's Republic of China, Office Action and Search Report Issued in Application No. 201210023688.6, dated Jan. 30, 2014, 13 pages.
United States Patent and Trademark Office, Notice of Allowance Issued in U.S. Appl. No. 13/020,153, dated Mar. 20, 2014, 5 pages.
United States Patent and Trademark Office, Office Action Issued in U.S. Appl. No. 12/834,031, dated Jun. 5, 2014, 24 pages.
State Intellectual Property Office of the People's Republic of China, Office Action Issued in Application No. 201210023688.6, dated Sep. 12, 2014, 7 pages.
European Patent Office, Office Action Issued in Application No. 11790189.2, dated Dec. 3, 2014, Germany, 3 pages.
State Intellectual Property Office of the People's Republic of China, Office Action and Search Report Issued in Application No. 201180027421.8, dated Jan. 27, 2015, 11 pages.
European Patent Office, Office Action Issued in Application No. 11790189.2, dated Feb. 9, 2015, Germany, 3 pages.
Raeder, J., "Programming in Pictures," Doctoral Dissertation in Philosophy (Computer Science), University of Southern California, Nov. 1984, 267 pages.
Hartl, A., "A Visual Rendering of a Semantic Wiki Query Language," Diploma Thesis, Munich Institute of Computer Science, Oct. 29, 2009, 122 pages.
Bansal, S., "Create an Excel Drop Down list with Search Suggestions," Trump EXCEL Website, Available Online at https://trumpexcel.com/excel-drop-down-list-with-search-suggestions/, Oct. 2013, 11 pages.
Gulwani, "Programming by Examples (and its applications in Data Wrangling)," In Book "Verification and Synthesis of Correct and Secure Systems," IOS Press, Jan. 1, 2016, 22 pages.
Gulwani, Sumit, "Programming by Examples", Retrieved on: Sep. 16, 2016 Available at: http://research.microsoft.com/en-us/um/people/sumitg/pubs/pbe16.pdf.
Singh, et al., "Transforming Spreadsheet Data Types using Examples", In Proceedings of 43rd Annual ACM SIGPLAN-SIGACT Symposium on Principles of Programming Languages, Jan. 20, 2016, 14 pages.
Gulwani, et al., "Spreadsheet Data Manipulation Using Examples", In Magazine, Communications of the ACM, vol. 55, Issue 8, Aug. 2012, 9 pages.
"Smart Autofill Spreadsheets Add On", Retrieved on: Sep. 16, 2016 Available at: https://cloud.google.com/prediction/docs/smart_autofill_add_on.
Wang, et al., "FIDEX: Filtering Spreadsheet Data using Examples", Retrieved on: Sep. 16, 2016 Available at: http://research.microsoft.com/en-us/um/people/sumitg/pubs/oopsla16-spreadsheet.pdf.
"Non-Final Office Action Issued in U.S. Appl. No. 15/338,161", dated Mar. 21, 2019, 16 Pages.
"Non-Final Office Action Issued in U.S. Appl. No. 15/299,412", dated Nov. 21, 2019, 28 Pages.
"Final Office Action Issued in U.S. Appl. No. 15/338,161", dated Oct. 29, 2019, 14 Pages.
Li, et al., "Efficient Interactive fuzzy keyword search", In Proceedings of the 18th international conference on World wide web, Apr. 20, 2009, pp. 371-380.
Webb, Chris, "New Ways to Concatenate Text in Excel 2016 with COCAT() and Text Join()", https://blog.crossjoin.co.uk/2016/02/05/new-ways-to-concatenate-text-in-excel-2016-with-concat-and-textjoin/, Feb. 5, 2016, 4 Pages.
"Final Office Action Issued in U.S. Appl. No. 15/299,412", dated Mar. 26, 2020, 27 Pages.
"Non-Final Office Action Issued in U.S. Appl. No. 15/338,161", dated Mar. 19, 2020, 8 Pages.
Hood, Jon, "Excel: Use Flash Fill, Concatenate and Text to Columns", Retrieved From: https://www.knowledgewave.com/blog/msoffice/excel-use-flash-fill-concatenate-and-text-to-columns.html. May 5, 2015, 13 Pages.
John, "How to Concatenate a Range with a Delimiter", Retrieved From: https://www.howtoexcel.org/vba/how-to-concatenate-a-range-with-a-delimiter/, Apr. 20, 2016, 5 Pages.
Johnson, et al., "Working with Formulas and Functions in Excel 2013", Retrieved From: https://www.informit.com/articles/article.aspx?p=2031329, May 8, 2013, 4 Pages.
"Non Final Office Action Issued in U.S. Appl. No. 15/299,412", dated Aug. 12, 2020, 27 Pages.
"Working with Formulas and Functions", Retrieved From: http://websites.delta.edu/cstfiles/cst-133/cst133_labPDFs/MS%20Excel%20Part%20I/msofficeintro_excel_b_working_with_formulas_and_functions.pdf, 2013, 17 Pages.
"Final Office Action Issued in U.S. Appl. No. 15/299,412", dated Dec. 1, 2020, 24 Pages.
"Non Final Office Action Issued in U.S. Appl. No. 15/299,412", dated Jun. 23, 2021, 10 Pages.

\* cited by examiner

EXAMPLE MANAGEMENT FOR STRING TRANSFORMATION

BACKGROUND

Large numbers of strings containing letters, numbers, and other characters can be held in datasets. Strings within the datasets can be combined, manipulated, and/or otherwise transformed in a variety of ways. Such data transformation is often achieved through the use of a transformation program, which can synthesized automatically using a programming-by-example technology and/or manually written by a user.

DETAILED DESCRIPTION

Figure 1:
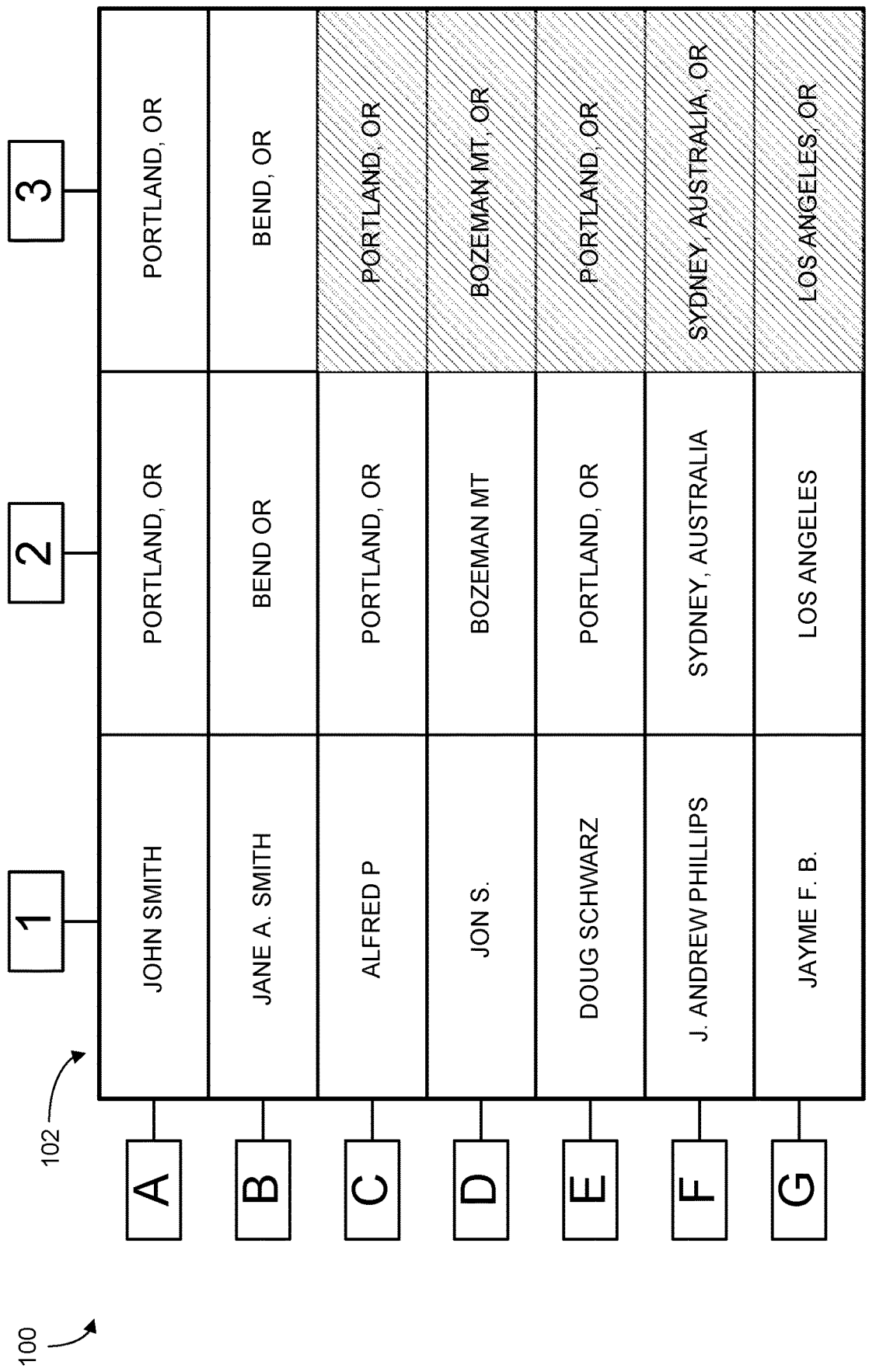
FIG. 1 schematically shows a dataset including strings.

Transforming alphanumeric strings in a dataset from one form to another can be a tedious, time-consuming, and error-prone process. Such datasets often include thousands or even millions of alphanumeric string entries. This can make it impossible to manually perform even basic data transformation operations, such as extractions, merges, and derivations. Still further, and perhaps even more difficult, is determining and generating the code necessary to make desired transformations.

Some existing solutions provide automated tools for transforming strings. For example, a user may make use of an automated transformation program to create a new column in a spreadsheet, the new column holding data extracted from an existing column. This transformation program may be generated based on examples provided by a user (e.g., via processes that "train" on the examples). However, it is frequently difficult, especially for non-technical users, to identify and provide examples that effectively train the transformation program to carry out the user's desired transformation. Accordingly, when a transformation program is generated based on non-ideal examples, it may encounter errors or produce improper outputs when applied to user data, especially when the program encounters inputs having unanticipated formats or values. It may be difficult or impossible for the user to identify which of their inputs were improperly transformed, or even discover that improper transformation took place to begin with, in the case of large datasets that the user cannot manually browse. Further, even after determining that an improper transformation took place, it can be difficult to provide new examples or manage existing examples in order to rework the improper transformation program.

Accordingly, the present disclosure addresses the technical problem of effectively transforming strings based on user-provided examples. The technical solution used to address this problem includes presenting one or more candidate example input strings to a user, which may be identified in a variety of ways. The user then provides example output strings for one or more of the candidate example input strings, with each example input string and its corresponding example output string defining a transformation example that is included in a set of such examples. As a technical effect of this solution, a string transformation program is generated based on transformation examples in the example set, and then applied to other input strings in a dataset to produce corresponding output strings. Managing transformation examples in this way can improve the functioning of an underlying computing system, by allowing a user to successfully transform strings in a manner that is more intuitive and transparent, as it provides the user with greater insight into and control over the string transformation program generation process.

Although the present disclosure focuses primarily on strings, the example management and data transformation techniques described herein may be similarly applied to virtually any type of data, value, or entry. Such data may be held in a dataset, database, spreadsheet, command line/shell environment, and/or other computing environment in which data is transformed.

FIG. 1 schematically shows an example of a dataset 100 holding a number of strings 102. It will be appreciated that datasets as described herein may include data held on one or more storage machines of one or more computer systems, and presented via any of a variety of suitable displays. A computing system used to manage a dataset and/or transform strings may have a variety of form factors, including a desktop computer, laptop computer, server, tablet computer, smartphone, wearable device, etc. Further, the dataset manipulation and example management techniques described herein may be distributed across multiple computers. For example, a computer that manages an example set and generates a string transformation program may be different from a computer that stores and manages a dataset that the string transformation program will be applied to. A computing system that generates string transformation programs and/or manages transformation examples as described herein may be implemented as computing system 700, described below with respect to FIG. 7.

Further, the appearance of dataset 100, as well as other datasets described below, is not intended to limit the present disclosure. It will be appreciated that any visual elements or user-interface elements described herein or illustrated in the figures are examples, and are only intended to serve as visual aids. Datasets, strings (e.g., input strings, output strings, example strings), transformation examples, example sets, etc., as described herein may have any suitable appearance, and may be interacted with by a user in a variety of ways.

Strings held in dataset 100 are referred to herein according to the labels appended to each row and column of dataset 100. For example, the string "JOHN SMITH" is referred to as 102A1, given its position in row A and column 1. Similarly, the string "LOS ANGELES" is referred to as 102G2, given its position in row G and column 2.

As shown, column 3 holds transformations of strings held in column 2. Such string transformation has been performed by a string transformation program, which may be programmatically generated by a computing system based on examples provided by a user. A string transformation program as described herein may take the form of any set of commands, operations, or other computer instructions usable to transform one set of strings (or other computer data) into another. Such string transformation programs may be programmatically generated according to software instructions executed by a computing system. A string transformation program may be divided into a plurality of individual operations or subprograms, which carry out individual steps as part of a larger transformation. In some implementations, string transformation programs may be domain-specific, being particularly optimized for interpreting geographic locations, telephone numbers, mailing addresses, etc. String transformation programs may be configured to consult external databases, lookup tables, online sources, etc., in order to obtain information relevant to properly transforming strings. For example, a string transformation program may consult a list of abbreviations in order to convert the full name of a location into an abbreviated form.

With respect to dataset 100 shown in FIG. 1, strings in column 2 may be referred to as input strings, while strings in column 3 may be referred to as output strings, where the illustrated transformation produces output strings based on the input strings. In additional/alternative transformations, strings held in any of columns 1, 2, and/or 3 may be used as input strings, and strings shown in columns 1 and/or 2 may be output strings of previously performed transformations. Accordingly, it will be appreciated that a dataset as described herein may generally include a set of input strings, and the set of input strings may include fewer strings than the overall dataset. Input strings may be arrayed in one or more columns in a spreadsheet, as shown in FIG. 1. However, in some implementations, input strings may be held in one or more rows, distributed between both columns and rows, and/or organized in other suitable manners that do not conform to a column/row/spreadsheet paradigm.

In the illustrated example, strings 102A3 and 102B3 are user-provided output strings corresponding to input strings 102A2 and 102B2. Such strings are provided as examples of a user's desired transformation, and are used to generate a string transformation program to carry out a transformation that produces output strings having the user's desired format. As will be described below, user-provided output strings and the input strings to which they correspond may define transformation examples in an example set. Such transformation examples may be used to generate a string transformation program. For example, strings 102C3-102G3 were output by a string transformation program generated according to the user-provided examples, as indicated by the background fill consisting of diagonal lines. These strings are transformations of corresponding strings 102C2-102G2.

As shown, the performed transformation added the characters ", OR" to the end of each input string that did not already include these characters. While this transformation is consistent with the user-provided examples, it is likely inconsistent with the user's expectations. For example, the user may have intended that each input string be transformed to include the name of a city followed by a comma and a two-letter abbreviation of the state or country in which the city is located. Had better examples been provided by the user, it is likely that the string transformation program would have produced output strings more consistent with the user's expectations. Accordingly, management of transformation examples as described herein improves the ability of a user to identify and provide transformation examples that can be used to effectively train string transformation programs. This may help the user to avoid improper transformations such as those shown in FIG. 1.

Figure 2:
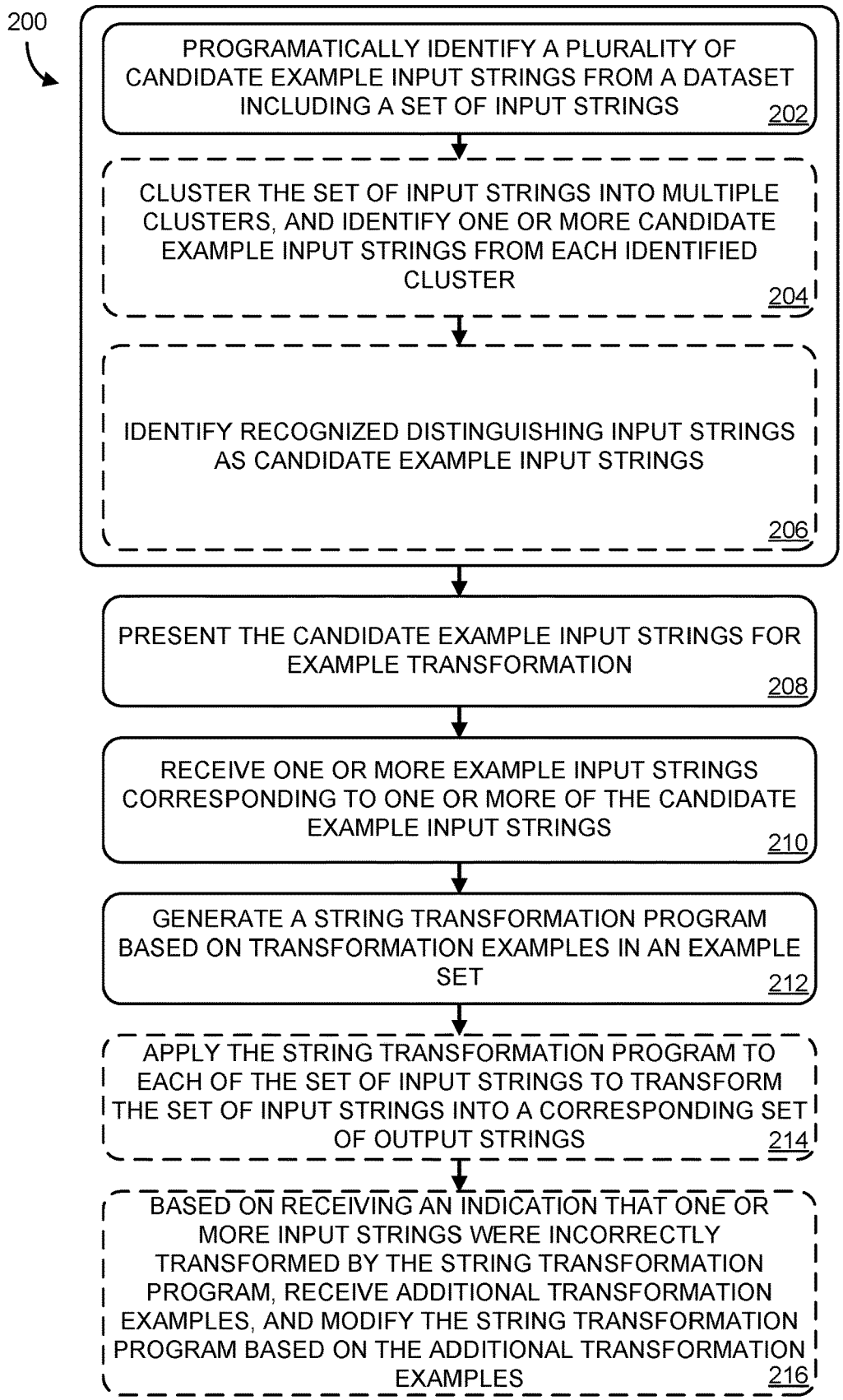
FIG. 2 illustrates an example method for transforming strings.

FIG. 2 illustrates an example method 200 for transforming strings that provides a user with increased control over example management. At 202, method 200 includes programmatically identifying a plurality of candidate example input strings from a dataset including a set of input strings. A candidate example input string may be any input string that is predicted by a computing system to serve as an effective example for use in generating a string transformation program to carry out a user's desired transformation. For example, a candidate example input string may represent a distinct format that is not well represented in the dataset. It may frequently be desirable to populate an example set with input strings having a variety of formats present in the dataset, so as to ensure that any generated string transformation programs can properly handle the diversity of formats present in the dataset. Additionally, or alternatively, a candidate example input string may be identified as a "distinguishing input," or an input string that returns multiple possible output strings when provided to multiple potential transformation programs. In some implementations, candidate example input strings may be automatically identified by a computing system. Alternatively, such candidate example input strings may not be identified unless an authorization or instruction to do so is received from a user. As indicated above, datasets such as those described herein can include thousands or even millions of individual strings. Dozens of different complex formats, patterns, and relationships can be represented in the data, making it effectively impossible for a human user to manually identify candidate example input strings with any consistency or accuracy.

Figure 3:
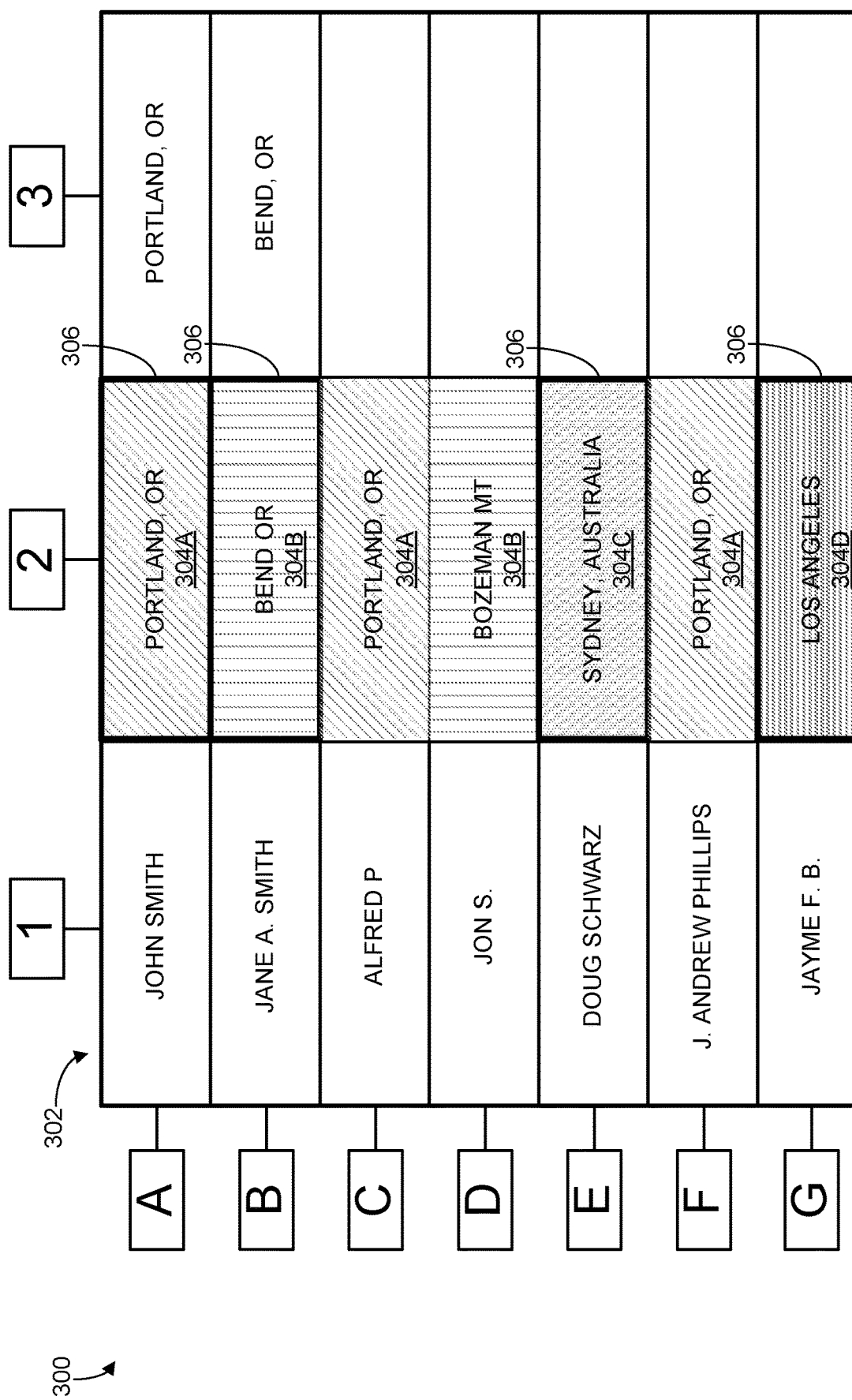
FIG. 3 schematically shows identification of candidate example input strings based on clustering.

Candidate example input strings can be identified in a number of suitable ways. For example, at 204, method 200 optionally includes clustering the set of input strings into multiple clusters, and identifying one or more candidate example input strings from each identified cluster. Clustering of strings may be done in a variety of ways. For example, the computing system may calculate multiple regular expression based descriptions for strings in the dataset, and sort strings with similar regular expression based descriptions into the same cluster. Additionally, or alternatively, the computing system may make use of one or more of a variety of string clustering algorithms including, for example, k-means clustering, expectation maximization, hierarchical clustering, etc. Clustering of strings is schematically illustrated in FIG. 3, which shows an example of a dataset 300 including a number of strings 302. As with strings 102, strings 302 are referred to according to their positions relative to the labeled rows and columns of dataset 300.

As shown, input strings 302 held in column 2 of dataset 300 have been clustered into multiple clusters 304. Specifically, input strings 302A2, 302C2, and 302F2 have been clustered into cluster 304A; input strings 302B2 and 302D2 have been clustered into cluster 304B; input string 302E2 has been clustered into cluster 304C; and input string 302G2 has been clustered into cluster 304D. Cluster membership is reflected in FIG. 3 both by reference numeral (i.e., 304A-304D), as well as differing background fill patterns. Cluster 304A includes strings having the general form of "city name (comma) two-letter abbreviation." Similarly, cluster 304B includes strings having the general form "city name two-letter abbreviation," with no comma separating the city name and abbreviation. Cluster 304C has a single string with the form "city name (comma) unabbreviated location name," while cluster 304D has a string that only includes a city name.

Clustering as described herein may be done using a variety of suitable mechanisms. Further, the clusters shown in FIG. 3 are provided for the sake of example, and are not intended to be limiting. Strings in a dataset may be grouped into any number of clusters, according to any similarities between different strings. The criteria used to cluster strings may have any suitable granularity—e.g., some clusters may include only strings that are exact duplicates, while other clusters include any strings that match a certain regular expression. Further, a computing system may generate a cluster including any strings that are determined to be invalid, because such strings have an improper format, seem to represent outliers in a larger trend, make no sense in context, etc. Strings in such a cluster may be excluded from presentation to the user for example transformation.

From the identified clusters 304, multiple candidate example input strings 306 have been identified. These are displayed as having darker outlines than other strings in dataset 300. A single candidate example input has been identified from each of the four identified clusters, meaning each unique string format from the set of input strings is represented by a candidate example input string. In some implementations, multiple candidate example input strings may be identified from each cluster, and/or different numbers of candidate example input strings may be identified from each cluster. For example, if a particular cluster is determined to be larger and/or relatively more diverse than other clusters, more strings of that cluster may be identified as candidate example input strings. A user may specify a desired number of candidate example input strings to be identified in total and/or from each cluster. Further, a computing system may not identify any strings from one or more clusters as candidate example input strings, based on determining that such clusters are less likely to be relevant to a user's desired transformation, for example.

The particular strings from each cluster that are identified as candidate example input strings may be selected in a variety of ways. For example, a computing system may automatically select the first string identified from each cluster, randomly select strings from each cluster, select strings that seem most representative of the format represented by the cluster, etc.

Candidate example input strings may additionally or alternatively be identified after recognizing any distinguishing input strings in a set of input strings. Returning to FIG. 2, at 206, method 200 optionally includes identifying recognized distinguishing input strings as candidate example input strings.

Based on transformation examples in an example set, a computing system may generate multiple potential string transformation programs, each consistent with the transformation examples. Such program generation may be done via the Flash Fill feature or ConvertString cmdlet included in software products provided by Microsoft®, for example, though string transformation programs as described herein may alternatively be generated in other ways. Such potential string transformation programs may be automatically applied to each input string in the dataset, producing output strings corresponding to each input string. Any input strings that correspond to two or more different output strings that differ from one another may be recognized as distinguishing input strings, and these may be identified as candidate example input strings. In other words, a first potential string transformation program and a second potential string transformation program may be applied to a particular input string, producing a first output string and a second output string. For several input strings in the dataset, the first and second output strings may identical. However, one or more input strings in the dataset may correspond to first and second output strings that differ from one another, and these are recognized as distinguishing input strings. This is schematically illustrated FIG. 4, which shows an example of a dataset 400 including a number of strings 402, labeled as described above.

As shown, column 2 of dataset 400 includes a set of input strings. Two different string transformation programs have been applied to each input string in column 2, generating two corresponding sets of output strings, shown in column 3 and column 4. When applied to the same set of input strings, the two string transformation programs have produced several differing output strings. Specifically, the string transformation program that produced output strings shown in column 3 added the characters ", OR" to each input string that did not already have such characters. In contrast, the string transformation program that produced output strings shown in column 4 changed each input string to have the general form of "city name (comma) two letter abbreviation." In other words, for input string 402G2 (i.e., "LOS ANGELES"), the string transformation program determined that Los Angeles is a city in the state of California, having the two-letter abbreviation "CA," and transformed the input string accordingly.

Figure 4:
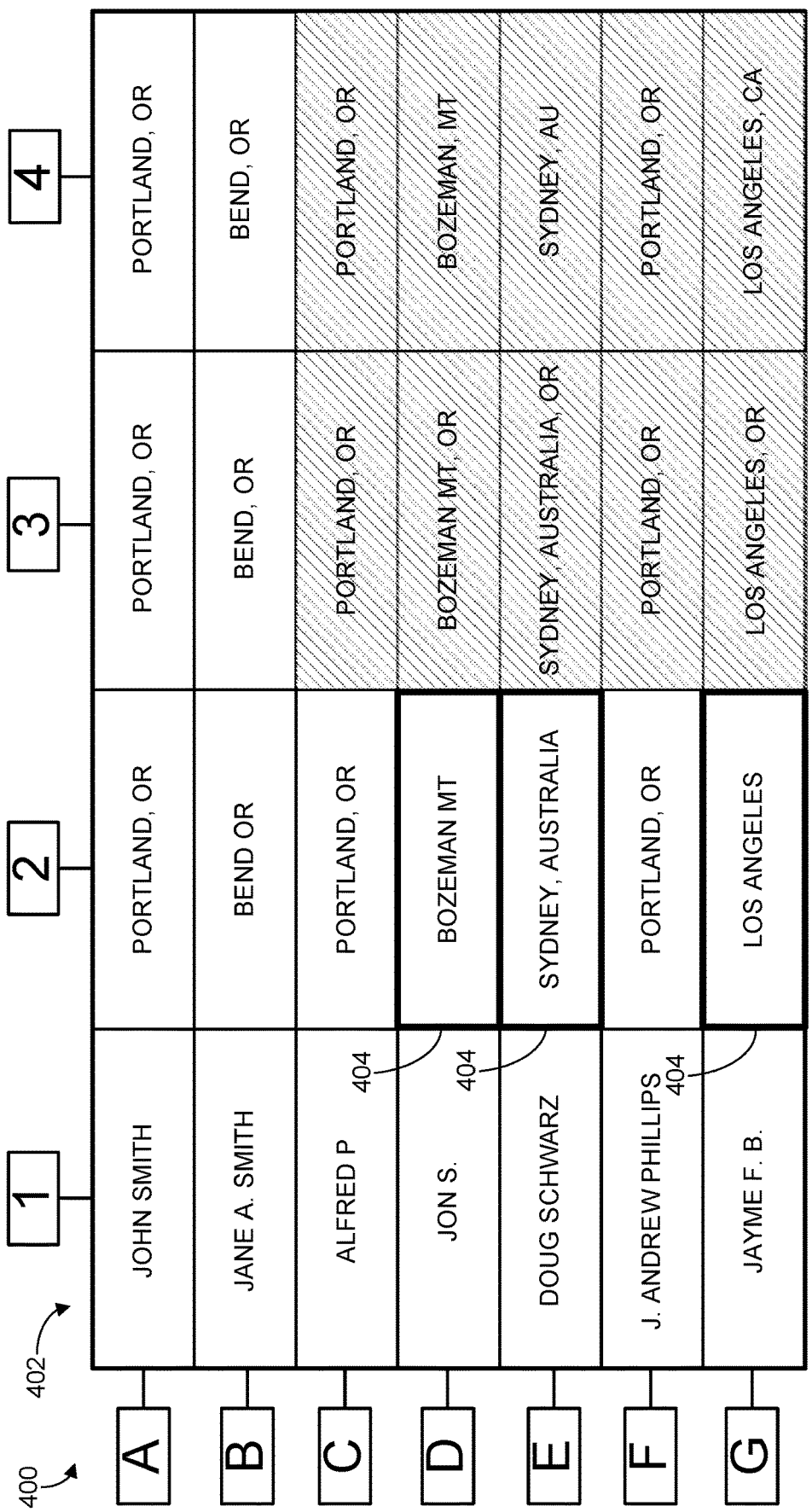
FIG. 4 schematically shows identification of candidate example input strings based on recognition of distinguishing input strings.

In some implementations, some or all of the output strings generated by the two string transformation programs may be shown to a user, as in the case shown in FIG. 4. This can allow the user to easily provide the intended output for that string by simply selecting between the various options instead of having to manually type it. Alternatively, output strings generated in the course of recognizing distinguishing input strings may be hidden from a user. In other words, each string 402 shown with a background fill consisting of diagonal lines (i.e., those strings generated by the string transformation programs) may be hidden to a user. Accordingly, one or both of columns 3 and 4 may be hidden from view entirely.

Out of the input strings held in column 2, three input strings quality as distinguishing input strings, as described above. Specifically, input string 402D2 produced two corresponding output strings that differ from one another when provided to the two different string transformation programs (i.e., output string 402D3 "BOZEMAN MT, OR" and output string 402D4 "BOZEMAN, MT"). Input strings 402E2 and 402G2 similarly resulted in differing output strings when the different transformation programs were applied. These strings have each been identified as candidate example input strings 404, shown as having darker outlines than other strings in dataset 400.

As indicated above, candidate example input strings may be identified in a variety of ways. Such identification may include both clustering and/or identification of distinguishing input strings, as described herein. Additionally, or alternatively, other suitable techniques for identifying candidate example input strings may be utilized. In general, a candidate example input string may be any input string predicted to serve as an ideal, effective, or otherwise useful example for generating a string transformation program.

Returning to FIG. 2, at 208, method 200 includes presenting the candidate example input strings for example transformation. This may be done in a variety of suitable ways. For example, candidate example input strings may be a emphasized relative to other strings in the dataset, as shown in FIGS. 3 and 4. Additionally, or alternatively, an example set that is independently viewable and/or manipulable from the rest of the dataset may be automatically populated with one or more of the identified candidate example input strings. This may provide the user with the opportunity to give example output strings for one or more of the candidate example input strings, thereby creating transformation examples.

Figure 5:
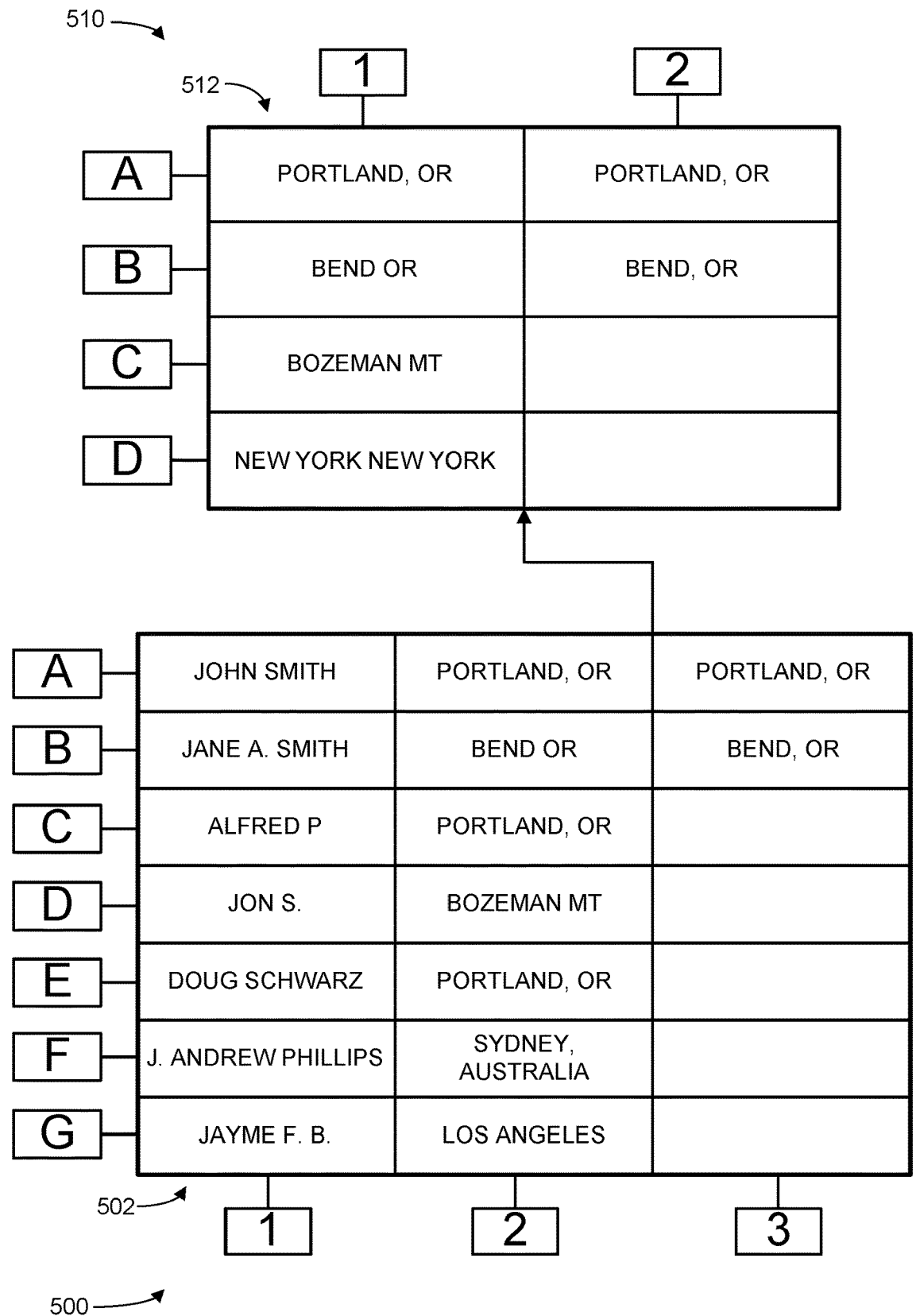
FIG. 5 schematically shows an example set including example strings associated with a dataset.

At 210, method 200 includes receiving one or more example output strings corresponding to one or more of the candidate example input strings. This is schematically shown in FIG. 5, which shows an example of a dataset 500 including a number of strings 502. FIG. 5 also shows an example set 510, including a number of example strings 512. An example set as described herein includes one or more transformation examples, which are defined as example input strings paired with their corresponding output strings. For example, the pair of example strings 512A1 and 512A2, as well as the pair of example strings 512B1 and 512B2, each define transformation examples. Based on transformation examples in an example set, a string transformation program may be generated to transform input strings in a dataset, such as strings in column 2 of dataset 500.

In some implementations, transformation examples in an example set may be viewable and/or manipulable separately from strings in an associated dataset. For example, the example set may be presented to the user separately from the dataset, on the same page, for example, or even in an entirely separate user interface. In such implementations, editing of example strings in the example set that correspond to strings in the dataset may cause similar editing of the corresponding strings. Additionally, or alternatively, example strings in an example set may be editable independently from any corresponding strings in a dataset, allowing the user to modify existing strings in order to generate synthetic inputs, as will be described below. Similarly, the example set may in some cases be hidden from a user, requiring the user to manage transformation examples within the dataset itself.

Transformation examples may be added to an example set in a variety of ways. For example, one or more transformation examples in an example set may include example input strings selected by a user from among a set of input strings in a dataset. Such user-selected input strings may or may not include previously identified candidate example input strings. As shown, example strings 512A1/512B1 and 512A2/512B2 are duplicates of strings 502A2/502B2 and 502A3/502B3 of dataset 500. Strings 502A3 and 502B3 of dataset 500 are user-provided output strings corresponding to input strings 502A2 and 502B2. In some implementations, upon a user adding an output string to a dataset, the output string may automatically be added to an example set as an example output string, along with any input strings to which the output string corresponds. Additionally, or alternatively, a user may have the option to choose which of his user-provided output strings should be added to an example set as part of a transformation example.

Similarly, a user may first select an input string from a dataset, and add this input string to the example set as an example input string. Once in the example set, the user may provide an example output string corresponding to the example input string, thereby creating a transformation example. Additionally, or alternatively, a computing system a be configured to predict one or more example output strings, as will be described below. Notably, the user may select and add any suitable input strings from a dataset to an example set, regardless of whether such strings were previously identified as candidate example input strings.

In some implementations, one or more example input strings in an example set may include candidate example input strings. For example, with respect to FIG. 4, the string "BOZEMAN MT" (404D2) was recognized as a distinguishing input string, and therefore identified as a candidate example input string. Accordingly, the example set 510 associated with dataset 500 includes "BOZEMAN MT" as an example input string (512C1). In some implementations, each identified candidate example input string may be automatically added to an example set for example transformation. In other implementations, the example set may only include example input strings explicitly selected by a user.

Further, in some implementations, transformation examples in the example set may include synthetic example input strings provided by a user and not present in the set of input strings in the dataset. For example, a user may anticipate that certain string formats may be present in the dataset, though not want to spend the time or effort required to find and add existing examples of this format from the dataset to the example set. Similarly, a user may expect that the dataset may eventually include strings having a particular format, even if such formats are not currently present. Accordingly, the user may manually create "synthetic" example input strings, or strings that the user adds to the example set that are not found in the original dataset. For example, example set 512 includes example input string 512D1 ("NEW YORK NEW YORK"), which is not found in dataset 500. Nevertheless, the computing system may receive an example output string corresponding to example string 512D1, thereby defining a transformation example.

As described above, example output strings corresponding to example input strings may be input by a user of a computing system (e.g., by typing or speaking, as well as other suitable input methods). Additionally, or alternatively, one or more example output strings corresponding to example input strings may be predicted based on a user input of a desired string transformation program. For example, a user may indicate, by clicking on user interface icons, providing a natural language prompt, providing computer instructions, etc., that the user intends for input strings to be transformed in a particular manner. Based on this user input, the computing system may predict one or more string transformation programs, and apply such program to example input strings in the example set, thereby generating one or more predicted example output strings for each example input string. Such predicted example output strings may then be selected and/or modified by a user, defining a transformation example when paired with any corresponding example input strings.

Returning to FIG. 2, at 212, method 200 includes generating a string transformation program based on transformation examples in an example set. As described above, for each example input string in an example set, a computing system may receive an example output string, where the example input and output strings together define a transformation example. Based on these transformation examples, the computing device may generate a string transformation program that, when applied to the example input strings, produces the example output strings. It will be appreciated that a variety of techniques may be used to generate a string transformation program from one or more transformation examples, and that any such techniques may be used to generate string transformation programs as described herein.

Figure 6:
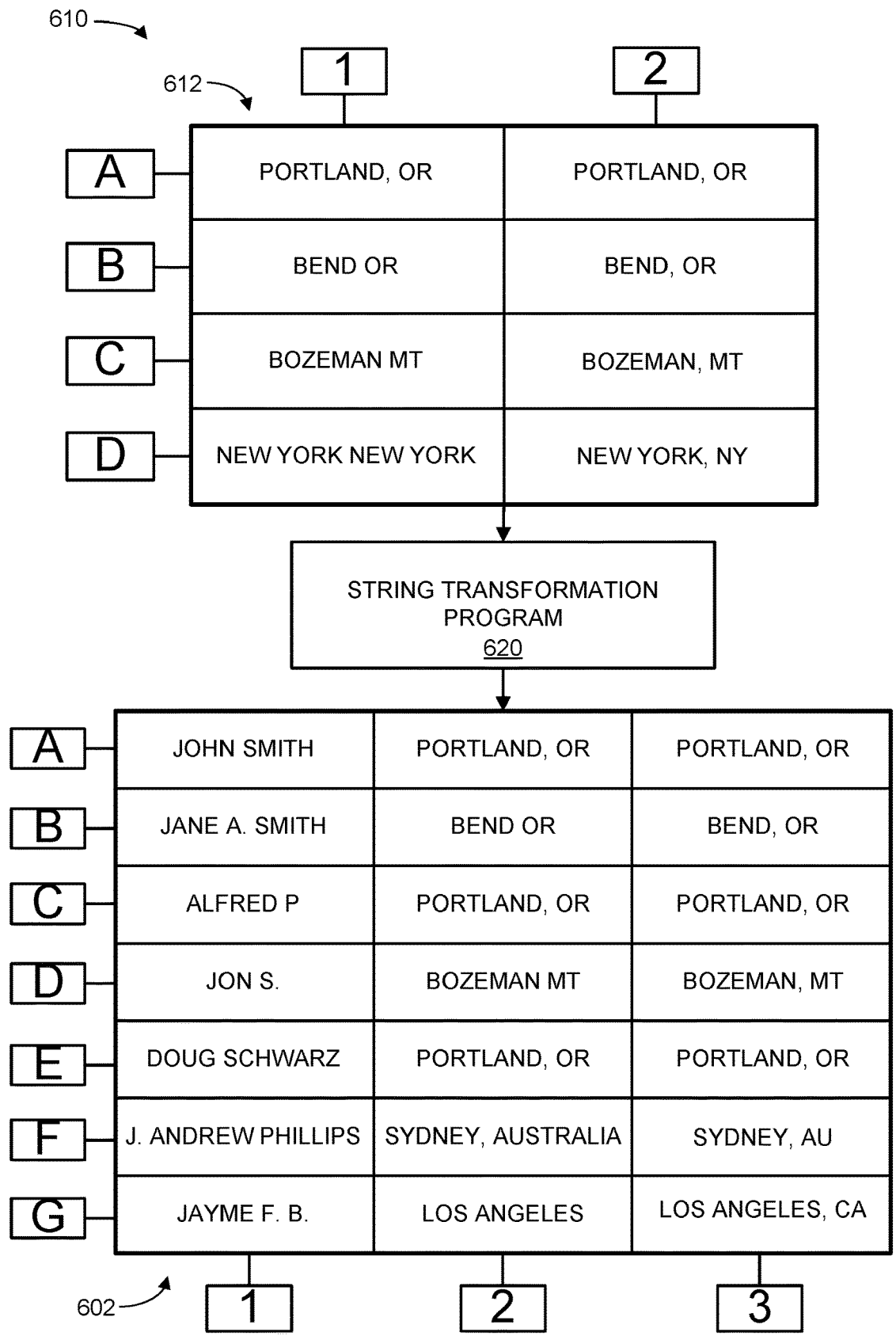
FIG. 6 schematically shows generation of a string transformation program.

Generation of a string transformation program is schematically illustrated in FIG. 6. FIG. 6 shows an example of a dataset 600 including a number of strings 602. Dataset 600 is associated with an example set 610 including a number of example strings 612. Example strings 612 may be added to example set 610 as described above with respect to FIG. 5.

As shown, each example input string in the example set has a corresponding example output string, for a total of four transformation examples.

Based on the transformation examples held in example set 610, a computing system may generate a string transformation program 620 consistent with those transformation examples. For example, if applied to an example input string of a transformation example, string transformation program 620 will produce an output string that matches the example output string corresponding to the example input string to which the program was applied.

In some implementations, a computing system may generate multiple string transformation programs, each consistent with the user curated transformation examples. Accordingly, the computing system may automatically select one of the generated programs, based on one or more ranking criteria. Alternatively, the computing system may prompt the user to identify which string transformation program should be used, for example by identifying and presenting one or more distinguishing input strings to the user. Further, under some circumstances, the computing system may be unable to generate any string transformation programs that are consistent with all of a user's transformation examples. In such situations, the computing system may identify and present any transformation example(s) that are potential outliers, and/or prompt the user to add/modify/delete transformation examples until a viable program can be generated. Transformation examples that qualify as outliers can be determined by identifying a set of transformation examples that are unnecessary for generating a string transformation program that is consistent with the remaining transformation examples.

As described above, a string transformation program may take the form of any set of commands, operations, or other computer instructions usable to transform one set of strings (or other computer data) into another. In some implementations, a user may choose to store a generated string transformation program so that it can be reused on the same or additional datasets. In such implementations, the computing device may also store the transformation examples in the example set, so that the program can be easily modified at a later time. Such storage of transformation examples may potentially result in potentially sensitive data being stored in a location that a user would not ordinarily expect. Such data could include, for example, personally identifiable information (PH), classified information, trade secrets, etc. Accordingly, in the event that a user chooses to store a string transformation program for later use, the user may be prompted to verify that the associated transformation examples do not include sensitive information. Such concerns can be alleviated when the user "sanitizes" the example set by, for example, providing synthetic inputs usable to generate a suitable string transformation program that nonetheless do not include sensitive information.

Returning to FIG. 2, at 214, method 200 optionally includes applying the string transformation program to each of the set of input strings to transform the set of input strings into a corresponding set of output strings. This is also shown in FIG. 6, in which the generated string transformation program 620 is applied to input strings in dataset 600. Specifically, program 620 is applied to each string in column 2, transforming each input string into a corresponding output string shown in column 3. The manner in which each input string is transformed is consistent with the user-curated transformation examples in example set 610, as the string transformation program was generated based on those transformation examples. In contrast to the transformation shown in FIG. 1, the transformation shown FIG. 6 successfully transformed the input strings in accordance with user expectations, as the user was able to carefully and intuitively manage the transformation examples that ultimately served as the basis for the string transformation program.

Returning to FIG. 2, at 216, method 200 optionally includes, based on receiving an indication that one or more input strings were incorrectly transformed by the string transformation program, receiving additional transformation examples, and modifying the string transformation program based on the additional transformation examples. In other words, it is possible that even after managing a set of transformation examples as described above, a generated string transformation program may incorrectly transform one or more strings. Upon review of output strings produced by the string transformation program, the user may identify one or more strings that were improperly transformed, and indicate to the computer system that improper transformation occurred. As a result, the user may have the opportunity to add new transformation examples to the example set, and/or modify existing transformation examples, in order to modify the string transformation program to successfully transform data in the dataset.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
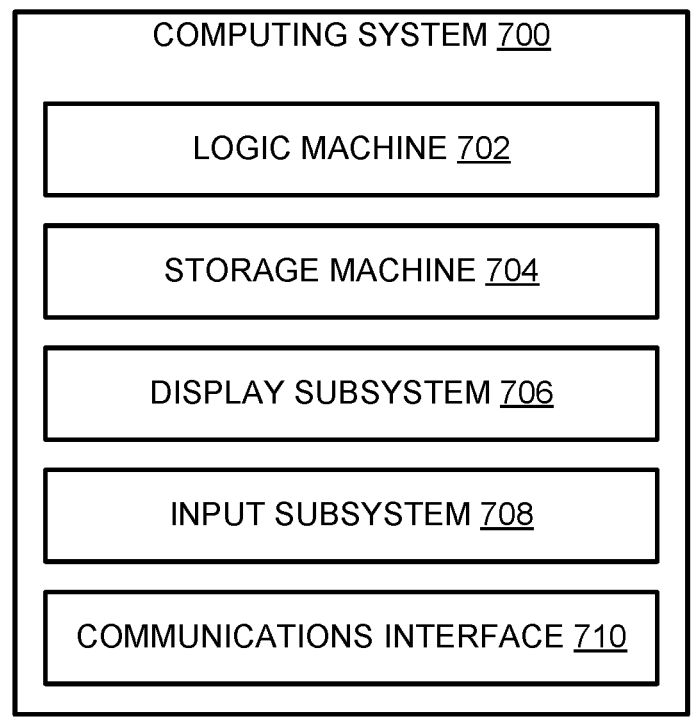
FIG. 7 schematically shows an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 702 and a storage machine 704. Computing system 700 may optionally include a display subsystem 706, input subsystem 708, communications interface 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," may be used to describe an aspect of computing system 700 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communications interface 710 may be configured to communicatively couple computing system 700 with one or more other computing devices. Communications interface 710 may include wired and/or wireless communication devices compatible with one or more different communication protocols. As non-limiting examples, the communications interface may be configured for communication via a wireless telephone network, or a wired or wireless local- or wide-area network. In some embodiments, the communications interface may allow computing system 700 to send and/or receive messages to and/or from other devices via a network such as the Internet.

In an example, at a computing device, a method for transforming strings comprises: identifying, programmatically, a plurality of candidate example input strings from a dataset including a set of input strings; presenting the candidate example input strings for example transformation; receiving one or more example output strings corresponding to one or more of the candidate example input strings, where each example input string and its corresponding example output string define a transformation example in an example set; and generating a string transformation program for transforming the plurality of input strings based on transformation examples in the example set. In this example or any other example, the method further comprises applying the string transformation program to each of the set of input strings to transform the set of input strings into a corresponding set of output strings. In this example or any other example, the method further comprises based on receiving an indication that one or more input strings were incorrectly transformed by the string transformation program, receiving additional transformation examples, and modifying the string transformation program based on the additional transformation examples. In this example or any other example, identifying the plurality of candidate example input strings includes clustering the set of input strings into multiple clusters, and presenting one or more identified candidate example input strings from each identified cluster for example transformation. In this example or any other example, identifying the plurality of candidate example input strings includes applying a first potential string transformation program and a second potential string transformation program to each input string in the set of input strings, thereby producing a first output string and a second output string for each input string in the set, recognizing as distinguishing input strings any input strings in the set for which the first output string is different from the second output string, and identifying such distinguishing input strings as candidate example input strings. In this example or any other example, example output strings corresponding to example input strings are input by a user. In this example or any other example, example output strings corresponding to example input strings are predicted based on a user input of a desired string transformation program. In this example or any other example, transformation examples in the example set include example input strings selected by a user from among the set of input strings in the dataset and not identified as candidate example input strings. In this example or any other example, transformation examples in the example set include synthetic example input strings provided by a user and not present in the set of input strings in the dataset. In this example or any other example, the set of input strings are arrayed in one or more columns in a spreadsheet. In this example or any other example, transformation examples in the example, set are viewable and manipulable separately from strings in the dataset.

In an example, a system for transforming strings comprises: means for identifying a plurality of candidate example input strings from a dataset including a set of input strings; means for presenting the candidate example input strings for example transformation; means for receiving one or more example output strings corresponding one or more candidate example input strings, where each example input string and its corresponding example output string define a transformation example in an example set; and means for generating a string transformation program for transforming the set of input strings based on transformation examples in the example set. In this example or any other example, the system further comprises means for applying the string transformation program to each of the set of input strings to transform the set of input strings into a corresponding set of output strings this example or any other example, the system further comprises means for receiving additional transformation examples based on receiving an indication that one or more input strings were incorrectly transformed by the string transformation program, and modifying the string transformation program based on the additional transformation examples. In this example or any other example, identifying the plurality of candidate example input strings includes clustering the set of input strings into multiple clusters, and identifying one or more candidate example input strings from each identified cluster. In this example or any other example, identifying the plurality of candidate example input strings includes applying a first potential string transformation program and a second potential string transformation program to each input string in the set of input strings, thereby producing a first output string and a second output string for each input string in the set, recognizing as distinguishing input strings any input strings in the set for which the first output string is different from the second output string, and identifying such distinguishing input strings as candidate example input strings. In this example or any other example, transformation examples in the example set include example input strings selected by a user from among the set of input strings in the dataset and not identified as candidate example input strings. In this example or any other example, transformation examples in the example set include synthetic example input strings provided by a user and not present in the set of input strings in the dataset.

In an example, at a computing device, a method for transforming strings comprises: programmatically applying a first potential string transformation program and a second potential string transformation program to each of a set of input strings in a dataset, thereby producing a first output string and a second output string for each input string in the set; recognizing as distinguishing input strings any input strings in the set for which the first output string is different from the second output string; identifying such distinguishing input strings as candidate example input strings; presenting the candidate example input strings for example transformation; receiving one or more example output strings corresponding to one or more candidate example input strings, where each example input string and its corresponding example output string define a transformation example in an example set; generating a string transformation program based on transformation examples in the example set; and applying the string transformation program to each of the set of input strings to transform the set of input strings into a corresponding set of output strings. In this example or any other example, the method further comprises clustering the set of input strings into multiple clusters, and identifying one or more candidate example input strings from each identified cluster.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device, a method for improving training of a string transformation program based on identification of transformation examples, the method comprising:
   from a dataset including a set of input strings, automatically selecting a plurality of input string examples for inclusion in an example set by identifying a plurality of string clusters in the dataset corresponding to different string formats represented in the dataset, and selecting one or more input strings from each cluster as input string examples for inclusion in the example set, wherein each of the plurality of input string examples in the example set are paired with a corresponding plurality of output string examples to define transformation examples in the example set;
   based at least in part on the transformation examples in the example set, generating first and second potential string transformation programs;
   identifying a plurality of ambiguous input string examples for inclusion in the example set, the plurality of ambiguous input string examples automatically identified by applying, to each of two or more input strings in the dataset, the first and second potential string transformation programs to the two or more input strings to transform the two or more input strings into first and second output strings for each of the two or more input strings, and identifying as ambiguous input string examples any of the two or more input strings for which content of the first output string and content of the second output string are different;
   receiving one or more disambiguating example output strings corresponding to one or more of the ambiguous input string examples, where each ambiguous input string example and its corresponding disambiguating example output string define a transformation example in the example set; and
   generating a string transformation program for transforming the set of input strings based on the transformation examples in the example set.

2. The method of claim 1, further comprising applying the string transformation program to each of the set of input strings to transform the set of input strings into a corresponding set of output strings.

3. The method of claim 2, further comprising, based on receiving an indication that one or more input strings were incorrectly transformed by the string transformation program, receiving additional transformation examples, and modifying the string transformation program based on the additional transformation examples.

4. The method of claim 1, where selecting the one or more input strings from each cluster includes randomly selecting one input string from each cluster.

5. The method of claim 1, where disambiguating example output strings corresponding to ambiguous input string examples are input by a user.

6. The method of claim 1, where disambiguating example output strings corresponding to ambiguous input string examples are predicted based on a user input of a desired string transformation program.

7. The method of claim 1, where the transformation examples in the example set include input strings selected by a user from among the set of input strings in the dataset and not identified as ambiguous input string examples.

8. The method of claim 1, where the transformation examples in the example set include synthetic ambiguous input string examples provided by a user and not present in the set of input strings in the dataset.

9. The method of claim 1, where the set of input strings are arrayed in one or more columns in a spreadsheet.

10. The method of claim 1, where the transformation examples in the example set are viewable and manipulable separately from strings in the dataset.

11. A computing system for improving training of a string transformation program based on identification of transformation examples, the computing system comprising:
  a hardware processor; and
  a physical storage device holding instructions that are executable by the hardware processor to:
    automatically select, from a dataset including a plurality of input strings, a plurality of input string examples for inclusion in an example set by identifying a plurality of string clusters in the dataset corresponding to different string formats represented in the dataset, and selecting one or more input strings from each cluster as input string examples for inclusion in the example set, wherein each of the plurality of input string examples in the example set are paired with a corresponding plurality of output string examples to define transformation examples in the example set;
    generate first and second potential string transformation programs based at least in part on the transformation examples in the example set;
    identify a plurality of ambiguous input string examples for inclusion in the example set, the plurality of ambiguous input string examples automatically identified by applying, to two or more input strings in the dataset, the first and second potential string transformation programs to the two or more input strings to transform the two or more input strings into first and second output strings for each of the two or more input strings, and identifying as ambiguous input string examples any of the two or more input strings for which content of the first output string and content of the second output string are different;
    receive one or more disambiguating example output strings corresponding to one or more of the ambiguous input string examples, where each ambiguous input string example and its corresponding disambiguating example output string define a transformation example in the example set; and
    generate a string transformation program for transforming the set of input strings based on the transformation examples in the example set.

12. The computing system of claim 11, the instructions being further executable by the hardware processor to apply the string transformation program to each of the set of input strings to transform the set of input strings into a corresponding set of output strings.

13. The computing system of claim 11, the instructions being further executable by the hardware processor to receive additional transformation examples based on receiving an indication that one or more input strings were incorrectly transformed by the string transformation program, and modifying the string transformation program based on the additional transformation examples.

14. The computing system of claim 11, where selecting the one or more input strings from each cluster includes randomly selecting one input string from each cluster.

15. The computing system of claim 11, where the transformation examples in the example set include input strings selected by a user from among the set of input strings in the dataset and not identified as ambiguous input string examples.

16. The computing system of claim 11, where the transformation examples in the example set include synthetic ambiguous input string examples provided by a user and not present in the set of input strings in the dataset.

* * * * *